Oct. 1, 1957  W. G. MITCHELL  2,807,972
MULTIPLE UNIT ASSEMBLY FOR ROTARY TOOLS
Filed Feb. 14, 1956  3 Sheets-Sheet 1

INVENTOR.
Walter G. Mitchell,
BY
Davis, Lindsey, Hibben and Noyes
Attys.

United States Patent Office 2,807,972
Patented Oct. 1, 1957

2,807,972

MULTIPLE UNIT ASSEMBLY FOR ROTARY TOOLS

Walter G. Mitchell, Aurora, Ill., assignor to Thor Power Tool Company, Aurora, Ill., a corporation of Delaware Application February 14, 1956, Serial No. 565,362

30 Claims. (Cl. 81—54)

This invention relates to improvements in multiple unit rotary tool assemblies and more particularly to a novel and improved arrangement for mounting a plurality of rotary power tools so as to permit rapid removal and replacement of individual tools.

In accordance with the current trend toward highly mechanized and automatic techniques in manufacturing and assembly operations, referred to generally as automation, it is common practice to mount a plurality of tools for operation in unison under automatic or semi-automatic control. For example, a gang or bank of electric drills may be mounted on a common support for movement as a unit into drilling position so as to drill a plurality of holes simultaneously and in any desired spaced arrangement on the work piece.

Another important example is found in the case of pneumatic or air operated tools where a plurality of tools are mounted on a common support and provided with a common manifold or plenum chamber for supplying air to each individual tool. Thus, a plurality of elongated air operated rotary wrenches or nutsetters may be detachably fitted between a support and a common air manifold having fluid passages communicating with the individual tools. However, it is necessary that each individual tool be detachable relative to the support and the air manifold so as to permit removal and replacement of the tools as required. With the arrangements heretofore proposed and used, the removal of an individual tool from such a multiple unit assembly has involved a number of inconvenient and time-consuming operations so that replacement of a worn, broken or otherwise malfunctioning tool has been an inefficient and burdensome operation at best.

In some such prior arrangements, tool extensions for operating the work-engaging attachments were secured to the underside of the supporting plate or were mounted in housings integral with the supporting plate, while the tools were bolted between the supporting plate and the air manifold. With such constructions, in the event a tool of the group required service or repair, it was necessary to loosen the bolts in both the plate and the manifold and tilt the tool to effect its removal through the space between the plate and the manifold. The bolts to be loosened were relatively inaccessible because of the presence of the other tools of the group and the supporting structures enclosing them, and the job of removal and replacement was tedious and expensive and resulted in putting out of operation an expensive piece of machinery and slowing down or even halting an assembly line.

Furthermore, it was also found that the malfunctioning of a tool in such arrangements was sometimes caused by the tool extension carried by the plate rather than by the tool which had already been removed, and consequently it was necessary to also unbolt the extension housing from the underside of the plate, or if the housing was integral with the plate, to remove the extension parts through the opening in the upper side of the plate. Here also such parts and bolts were relatively inaccessible and further increased the time required for removal and replacement.

Where the tool batteries in the past have been mounted on a power operated bed movable into an operating position with the tools in initial engagement with the work, such as cap screws to be tightened, it was found that since the bed was not operated thereafter so as to follow the screws down as they became tightened, the tools frequently became disengaged from the screws before they became fully tightened. In spite of this disadvantage, no means has heretofore been devised in the automatic machines for maintaining the tool sockets in driving engagement with the work until completion of the operation. No such problem presented itself with the smaller hand manipulated batteries of nutsetters inasmuch as the operator provided the necessary following movement of the tools with respect to the screws.

Such batteries of tools also had the disadvantage of difficult lubrication since it was necessary to lubricate each tool individually by pressure injection from an outside source. This individual lubrication also increased the servicing time and was best accomplished when the tools were not in operation and consequently lubrication of the tools was not as frequent as desired. Moreover, the lubrication of the extension and the operating parts of the tool itself were individual operations which tended to double the time required for lubrication.

It has also been found that the operation of a battery of pneumatic tools created an extremely loud noise which was multiplied many fold when a plurality of such batteries were operated simultaneously in an assembly line. Such noise was obviously undesirable and not only has retarded plant operations and caused many inconveniences but also has affected the physical conditions of operators working near or supervising the machines. This has prevented to some extent the mass application and grouping of such batteries of tools.

Accordingly, a primary object of the present invention is to provide novel means for detachably mounting the individual tools of a multiple unit tool assembly.

Another object of the invention is to provide an improved arrangement for detachably mounting a plurality of pneumatic tools for simultaneous operation from a common fluid manifold.

A further object of the invention is to provide a novel and improved mounting arrangement in a multiple unit rotary tool assembly characterized by great ease and simplicity of removing and replacing individual tools.

An additional object of the invention is to provide a novel multiple unit assembly structure for pneumatically actuated rotary tools whereby individual tools can be rapidly and easily connected to or disconnected from a common air supply manifold with a minimum of necessary mechanical operations.

Another object is to provide a novel and improved mounting arrangement for a plurality of rotary power tools whereby one of the tools and its operating extension may be removed or replaced as an entire unit from its supporting means with a minimum of effort and in one operation for the purpose of service or repair of the entire unit.

A further object is to provide an improved form of pneumatic rotary power tool having a unitary extension portion secured thereto and which has provision for ready assembly and disassembly as a unit to a supporting plate and an air manifold commonly supporting a plurality of such tools.

Another further object is to provide an improved mounting arrangement for a plurality of rotary power tools and a novel form of lubricating means for such tools associated with such mounting means whereby the entire group of tools may be thoroughly and automatically lubricated at desired intervals without removal of the tools and during operation thereof, such lubricating means in no way interfering with the ease of removal and replacement of individual tools from the supporting means.

Still another object of the invention is to provide an improved form of rotary power tool adapted to be mounted in a plurality of units on a movable supporting bed and incorporating a mechanism whereby individual tool units may follow down a piece of work, such as a cap screw to be tightened after the main bed has stopped and remain in engagement with the work until the operation is completed.

A still further object is to provide an improved mounting arrangement for a plurality of power tools and incorporating means for deadening the operating noise of said tools, said means in no way interfering with the ease of removal and replacement of individual tools from the supporting means.

Still another object is to provide an improved mounting arrangement for a plurality of power tools whereby the tools may be individually removed and replaced with a minimum of mechanical operation and at the same time may be grouped so that their operating centers are closely positioned for operating on work pieces which are closely adjacent each other.

Other objects and advantages of the invention will become apparent from the subsequent detailed description taken in conjunction with the accompanying drawings, wherein.

Referring first to Figs. 1 to 4 of the drawings, a multiple spindle nutsetter assembly is shown such as might be utilized in the tightening of cylinder head bolts or cap screws or the setting of exhaust manifold studs in an automotive engine assembly operation. In this particular embodiment, the invention comprises a bank of eight pneumatically actuated rotary tools which are arranged in two superimposed horizontal rows of four tools each, as designated generally at 11 and 12. As will best be seen from Figs. 1 and 3, the tools 12 in the lower row have an axially straight or aligned construction whereas the tools 11 in the upper row have an axially offset design so as to facilitate close grouping of the operating spindles or driving portions of the tools. Obviously, any suitable number and grouping of tools may be employed to accommodate the requirements of the particular work piece involved.

Figure 1:
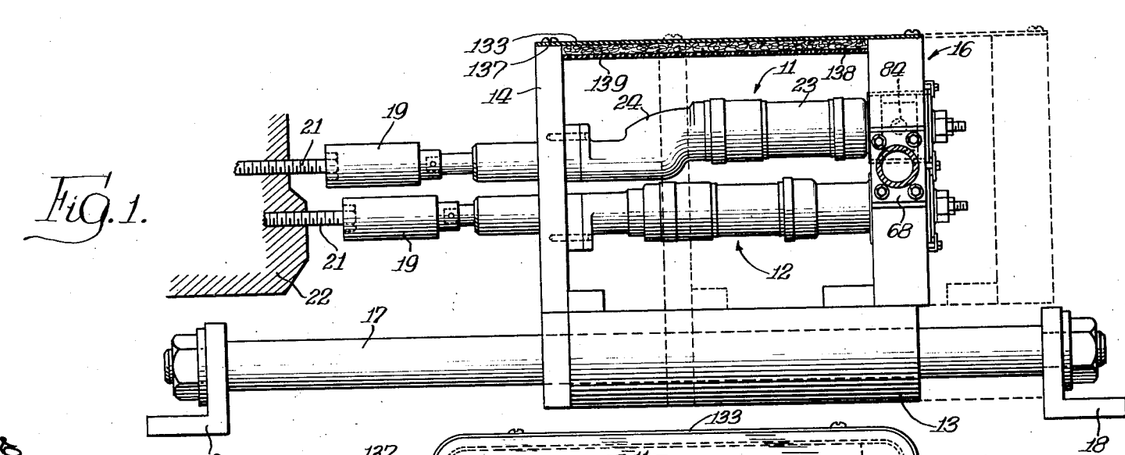
Fig. 1 is a side elevational view of a multiple unit nutsetter assembly such as might be used in tightening the cylinder head bolts of an automotive engine.

As seen in Fig. 1, the tools 11 and 12 are of the elongated character and are supported for horizontal movement in unison by means of a base 13 having an upright plate portion 14 through which the tools 11 and 12 extend at their operating ends and an upright air manifold designated generally at 16 and connected to the tools 11 and 12 in axially spaced relation from the plate 14. The base 13 is mounted for horizontal sliding movement along a pair of stationary guide rods or tracks 17 disposed at opposite sides of the base 13 and extending between a pair of brackets 18. Each of the forwardly projecting operating ends of the rotary tools 11 and 12 carries a tool element or socket 19 so as to engage a plurality of work elements which are shown for the sake of illustration as a plurality of cap screws 21 adapted to be tightened in a cylinder head 22 or the like. By control means not directly pertinent to the present invention, the entire bank of tools 11 and 12 carried between the support plate 14 and the air manifold 16 may be shifted into and out of initial operating engagement with the work by shifting of the slidable base 13 along the rods 17. Thus, in Fig. 1 the device is illustrated in full lines in the left-hand position of the base 13 wherein the sockets 19 are engaged with the bolts 21, and the disengaged or extreme righthand position of the base 13 is shown in broken lines.

Figure 3:
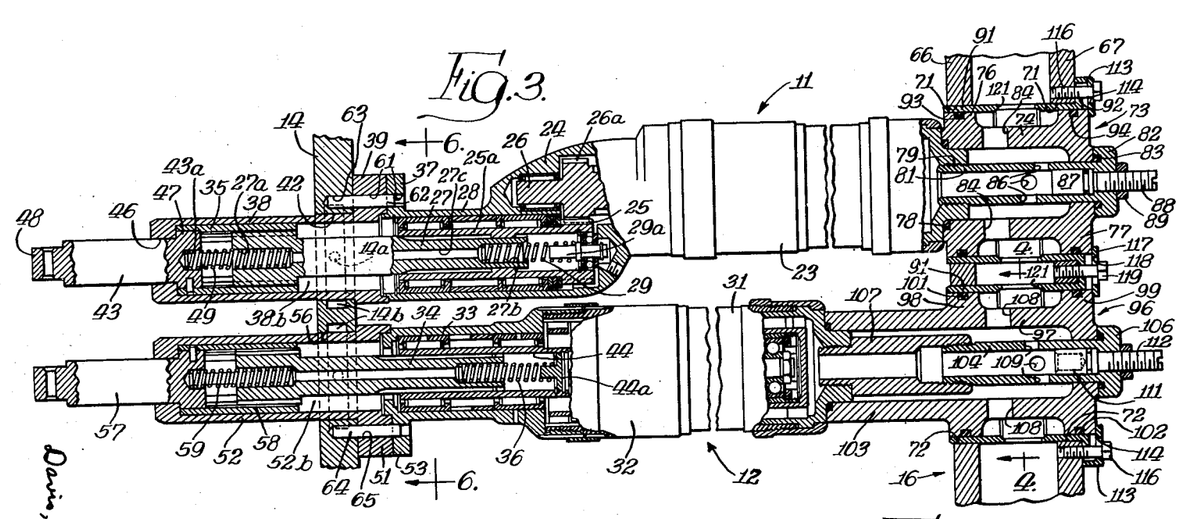
Fig. 3 is an enlarged longitudinal sectional view, partly in elevation, as taken along the line 3—3 of Fig. 2.

Referring particularly to Fig. 3, each of the uppermost offset tools 11 has a pneumatic motor section 23 and an offset gear case section 24, the latter providing a drive connection between a main drive shaft 26 and a parallel drive spindle 27 having an axial bore 27c extending therethrough and contained within an elongated tubular spindle support 28 comprising the forward extension of the gear case 24. A pinion gear 26a on the drive shaft 26 meshes with and drives a gear 25 on the gearward end of a drive sleeve 25a. The drive spindle 27 has a splined connection to the inner walls of the drive sleeve 25a so as to be driven by the sleeve but axially slidable with respect thereto. The drive spndile 27 is spring pressed forwardly by means of a spring 29 anchored at one end in a socket 27b in the rearward end of the spindle and at its other end on a rotatable stub shaft 29a. The forward end of the spindle 27 is splined to another rotatable sleeve 35 rotatably supported within a tubular extension housing 38.

Figure 6:
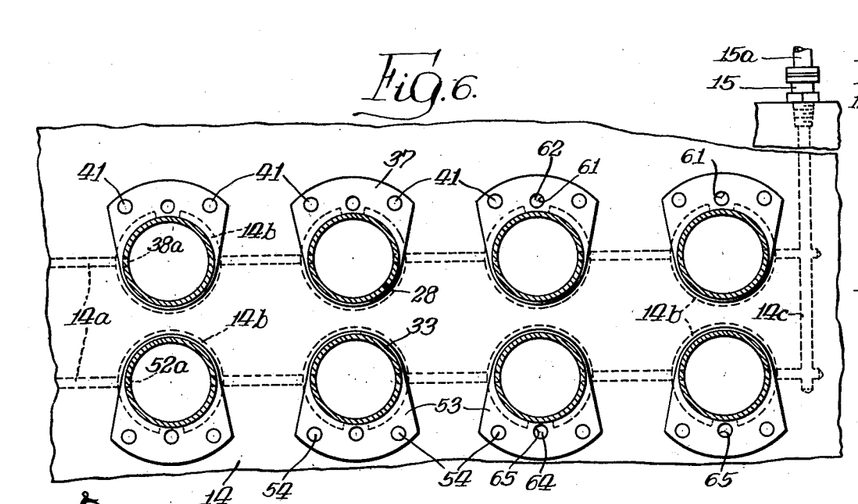
Fig. 6 is a fragmentary view, partly in section and partly in elevation, as seen along the line 6—6 of Fig. 3.

The tubular housing 38 has a flange portion 39 secured to a coincidental flange portion 37 on the spindle housing portion 28 of the casing 24 by means of a plurality of screws 41 as shown in Fig. 6. These flanges are fan-shaped or pie-shaped for reasons to be explained hereinafter. The housing member 38 of each tool 11 extends through a suitable aperture 42 in the forward support plate 14 and contains an extension spindle 43 keyed to the connecting sleeve 35 for rotation therewith. The extension spindle 43 projects through a restricted diameter opening 46 in the end of the housing 38 and has an enlarged shoulder portion 47 at its rearward end for limiting the extent of outward movement of the spindle 43 from the housing 38. The outermost end of the extension spindle 43 is provided with suitable means 48 for detachably mounting the sockets 19 (Fig. 1) or other tool elements.

A spring 49 is interposed between the rearward end of the extension spindle 43 and the forward end of the main driving spindle 27, the spring 49 being anchored at its ends in sockets 43a and 27a of the spindles. From the foregoing, it will be seen that both rotating spindles 27 and 43 are axially slidable and the extension spindle is retractible and urged forwardly into projected position by the combined action of springs 29 and 49. Thus when the base 13 is moved toward the work, the sockets 19 may first engage the cap screws 21 and such movement of the base may be continued until it reaches the end of its travel to final stationary operating position. This continued bed movement will compress both springs 29 and 49 and cause the spindles 43 and 27 to slide rearwardly in the housings 38 and 28. When the tools are operated, the cap screws 21 are rotated and enter into the cylinder head 22 thus moving away from the main body portion of the tool 11 and the base 13. However, the combined expansion of the springs 49 and 29 causes the spindles 43 and 27 to slide forwardly as they are rotated with the result that the sockets 19 on the end of the spindle 43 follow up the cap screws 21 and follow them down to seated position without breaking off engagement even though the bed 13 remains stationary during the tightening operation. This spring arrangement also permits the tools to automatically adjust themselves to irregularities in positions of the cap screws as shown in Fig. 1.

The lower group of tools 12 are of generally similar arrangement and have a similar mode of operation except for the axial offset of the tool. Each has a pneumatic motor section 31, a gear section 32 and a forwardly extending tubular spindle support 33 containing a driving sleeve 44 connected to the gear train and having a splined connection with the main drive spindle 34. A retractible extension spindle 57 is keyed at its rearward end to a connecting sleeve 58 to which the forward end of the main drive spindle 34 is splined. A spring 59 is interposed between the spindles 57 and 34 and a spring 36 is interposed between the rearward end of the spindle 34 and a plate 44a carried by the sleeve 44. Similar to tools 11, the spindles 57 and 34 are both rotatable and axially slidable and the springs 59 and 36 are compressible as the bed 13 is moved initially to engage the sockets 19 with the cap screws 21 and permit the sockets 19 to follow up the screws 21 and tighten them down to seated position.

A housing 52 encloses the forward end of the spindle 34, the rearward end of the extension spindle 57 and the connecting sleeve 58 and has a radially extending flange portion 51 secured to the coincidental radial flange portion 53 of the housing 33 by screws 54, these flange portions also being shaped in the same manner as those of tools 11, as shown in Fig. 6. The extension spindle housing 52 extends through a circular opening 56 in the plate 14 so that the tool is supported thereby intermediate its ends.

Figures 7, 9:
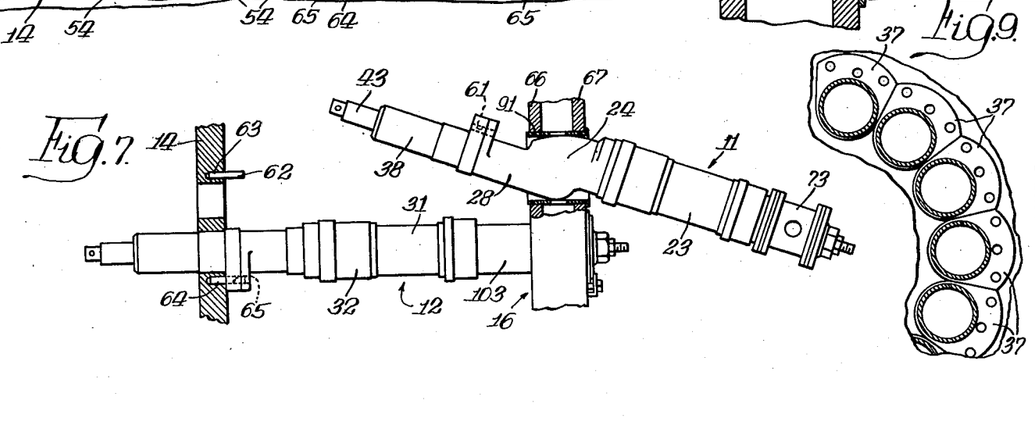
Fig. 7 is a fragmentary elevational view similar to Fig. 1 but showing the manner of removing one of the individual tools from the assembly.
Fig. 9 is a horizontal sectional view similar to Fig. 6 and showing a modified manner in which the plurality of tools may be mounted on a supporting plate and in the air manifold nad also showing the manner in which the plate engaging flanges may be closely nested together for tool operation.

It is also to be noted that the axial length of the extension spindle devices for any of the tools 11 and 12 may be varied to meet the requirements of any particular work piece being operated upon. In other words, although the axial distance between the support plate 14 and the manifold 16 is fixed, the overall length of the tool may readily be altered by attachment of an extension spindle device of suitable length. The flange portions 37 and 53 of the tools 11 and 12 are, as shown in Fig. 6, somewhat fan or pie-shaped and it has been found that such a manner of connecting the housings 28 and 38 and 33 and 52 of the respective tool on one side of the axis is quite satisfactory inasmuch as the tools are rigidly and tightly secured in the openings in the plate 14 and in the manifold 16 and are clamped therebetween. As shown in Fig. 9, the tools may be arranged in circular manner where it is desired to tighten cap screws arranged in close proximity in a circular manner, although other arrangements are contemplated in utilization of the present invention. In such an arrangement, the fan-shaped joining flanges may be nested with their wider portions on the outer edges of the group which permits the tools to be moved in closer to the center of the arrangement and for the sockets 19 of the extension spindles to engage cap screws which from the inherent nature of the work piece must necessarily be situated in a close arrangement. The tools thus may be disposed in a variety of other arrangements in addition to those shown in the drawings and the fan-shaped flanges permit their disposition in close operating proximity without interference and at the same time permit ready removal and replacement of the tools in proper operating position.

For purposes of rapid detachment of individual tools 11 or 12 from the assembly and replacement with new tools, as hereinafter described in greater detail, it is necessary that the individual tools be supported in the plate 14 in a readily removable fashion. With this objective in mind, the fit of the extension spindle supports 38 and 52 in the apertures 42 and 56, respectively, in the support plate 14 is sufficiently loose to permit the tools to be moved axially with ease relative to the plate 14 both during rearward withdrawal of a tool or forward insertion of a tool through the plate 14. At the same time, however, the fit of the extension spindle housings in the support plate apertures is sufficiently snug to provide the desired rigid support against radial movement whereby to maintain the predetermined spaced relation between the extension spindles or drive portions of the tools and to seal effectively against lubricant leakage as will be described hereinafter.

In order to facilitate rapid assembly and disassembly of individual tools relative to the forward support plate 14, I have entirely eliminated the use of threaded connector elements such as screws between the tools and their extensions and the support plate 14. Such screws in the past have required an excessive amount of time for their disconnection with consequent undue loss of production from the assembly containing the disabled tool requiring service. Furthermore, I have formed the extension as a unitary part of the tool so that the tool is removed as an entire unit for service and repair of all operating parts including those of the extension. I have thus eliminated the disadvantages of the older constructions wherein the extension portions of the tools were bolted to the under side of a plate or the extension housings were integral parts thereof, thus requiring the tool and the extensions to be removed separately in time consuming operations and to be serviced as separate units. The flange portions 37 and 53 also serve the important function of locating the tools in proper axial position relative to the plate 14 and head 16 inasmuch as it is only necessary to push the flanges down tight against the upper surface of the plate 14 with the extensions going on down through the plate openings.

In order to prevent bodily rotation or twisting of the tools 11 and 12 due to torque reaction during operation of the device, I provide each tool with a quickly detachable torque reaction means in the form of a pair of complementary socket and projection portions coacting between each individual tool and the plate 14 and in offset or eccentric relation with respect to the axis of the respective extension spindle housings which project through the apertures in the support plate 14. Thus, in the case of a tool 11, the interconnected flange portions 37 and 39 have a common socket portion 61 adapted to receive a pin 62 (Figs. 3 and 6) having a tight frictional fit in the bore 63 and projecting rearwardly from the plate 14. The rearward end of the pin 62 is adapted to have a quickly detachable fit in the socket 61 in the tool flange portions 37 and 39 thereby restraining the tool 12 against rotative movement relative to the plate 14. As will readily be understood, the detachable fit of the pin 62 relative to the socket 61 provides a quickly alignable mounting means for insuring accurate location of the tool 11 relative to the mounting plate 14 while at the same time serving as a torque reaction element in conjunction with the extension of the spindle housing 38 through the aperture 42 in the plate 14 and also permitting the tool to be withdrawn readily from the plate 14.

A similar means for resisting the torque reaction and permitting ready withdrawal is also provided for each of the tools 12. Thus, the interconnected flanges 51 and 53 are provided with aligned bores forming a socket 65 adapted to receive a pin 64 (Fig. 6) which is carried by and extends forwardly from the plate 14 adjacent the opening in the plate.

The present invention also contemplates a novel means by which operating parts of the tools may be lubricated in assembled position but which at the same time in no way interferes with the ease of attachment and removal of the tools. To this end, as shown in Figs. 3 and 6, I provide the plate 14 with a plurality of lubricant conducting passages 14a which terminate in slightly enlarged annular channels 14b in the walls of the plate openings. The extension housings 38 and 52 of the tools 11 and 12 are provided with apertures 38a and 52a, respectively, which are spaced forwardly of the flange portions 39 and 51, respectively, so as to be properly aligned with the annular channels 14b when the tools have been pushed home to operating position on the plate 14. The flanges 39 and 51 thus serve the additional function of readily aligning the lubricant passages. As shown in Fig. 3, the portions of the extension housings 38 and 52 which engage in the openings 42 and 56 of the plate 14 are provided with machined surfaces so as to have a tight fitting engagement with the plate 14 and to prevent the leakage of lubricant.

The passages 14a connect to the annular channels 14b in the plate openings and also to an end or cross passage 14c which is connected to a fitting 15 threadedly secured to the plate 14 and to a tube 15a. The tube 15a may be connected to a source of lubricant under pressure (not shown) which may be automatically operable at timed intervals to supply the necessary lubrication to the tools for efficient operation and substantially reducing maintenance and repair costs. It is to be understood, however, that the fitting 15 may be provided with a nipple whereby the lubrication may be supplied by a grease gun (not shown) applied thereto manually.

By the foregoing arrangement, when lubricant is forced through the fitting 15 into the passages 14c, 14a and 14b of the plate 14, it passes on into the tools and into the chambers 38b and 52b of the housing 38 and 52 wherein the main drive spindles 27 and 34 are of reduced diameter. The lubricant under pressure then passes forwardly through the splined connections to the spring chambers between main drive spindles and the extension spindles and thence rearwardly through the hollow main drive spindles and into the gear casing. Thus, all of the operating parts of the tools and their extensions forwardly of the motor housings are lubricated from the plate 14, the tools and plate 14 coacting to this end. The pneumatic motors in the housings 11 and 31 may be lubricated in the customary manner by an air line lubricator (not shown) connected in the air line.

The tools 11 and 12 are also supported in and project through the air manifold 16 by a means providing for ready removal and replacement of a single tool in a minimum of time and without disturbing the other tools of the group. This is in contrast with prior known arrangements wherein the tool head was secured to the air manifold by screws or bolts and could be removed only by loosening and removing the screws or bolts, by loosening spacing elements and then cocking or tilting the tool so as withdraw the tool laterally through the space between the mounting plate 14 and the air manifold 16. This not only was tedious and time consuming and required the operator to reach in and manipulate tools in close quarters between the tools of the group and between supporting plates but also, if the disabled tool to be removed was in the central portion of the group and surrounded by other tools, the outer tools had to be removed to clear the way for tilting and removal of the center tool. All this is eliminated by the present invention.

Figure 2:
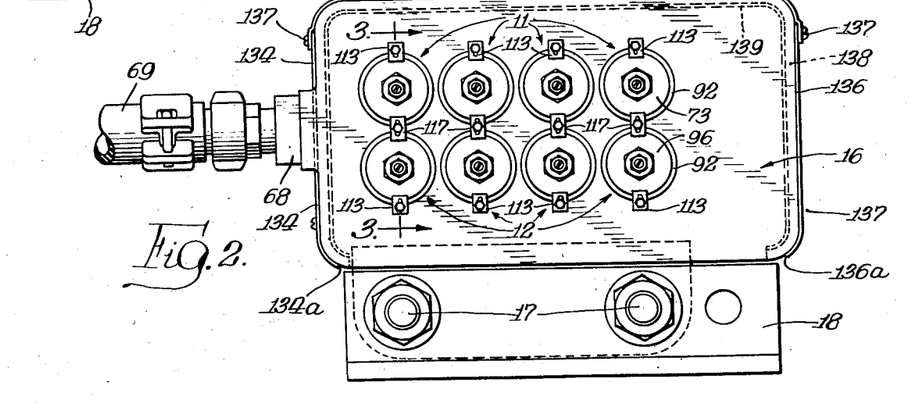
Fig. 2 is an end view of the device as seen from the right in Fig. 1.

At the rearward or right-hand end of the assembly as seen in Figs. 1, 2, and 3, the air manifold 16 is shown as a generally rectangular hollow structure extending transversely to the axes of the tools and having a pair of spaced parallel forward and rear walls 66 and 67, respectively. An inlet 68 is provided at one vertical edge of the manifold 16 and has connected thereto in any conventional manner a hose 69 or other flexible conduit for supplying air under pressure to the manifold. For accommodating the passage of an entire tool therethrough, the manifold 16 is provided with a plurality of enlarged openings extending through the walls 66 and 67 thereof, as designated at 71 in the case of the tools 11 and at 72 in the case of the tools 12. For interconnecting the individual tools with the air manifold 16, each tool is provided with a cartridge type head or fluid connector which may be secured to the motor section of the tool in unitary fashion and which also provides a detachable sealed connection in one of the openings through the air manifold 16.

Referring first to the tool 11, the cartridge type fluid connector head is designated generally at 73 and comprises a tubular spool portion 74 having radial flanges 76 and 77 at its opposite ends. The forward end of the spool portion 74 seats tightly against the rearward or fluid inlet end of the pneumatic motor section 23 and a suitable seal ring 78 is provided therebetween. The fluid inlet to the motor section 23 has a threaded opening 79, and a tubular valve body 81 has a threaded connection in the opening 79. The valve body 81 extends rearwardly beyond the end of the spool portion 74 and has an integral manipulating portion such as the nut 82 which bears against the outer end of the connector head 73. A seal ring 83 is also interposed between the nut 82 and the outer end of the connector head 73. As will be readily apparent, by tightening the nut portion 82 of the valve body 81, the fluid connector head 73 is rigidly clamped to the inlet end of the pneumatic motor section 23 of the tool 11 so as to form in effect an integral part of the tool.

The spool portion 74 is provided with ports or openings 84 for the passage of air from within the manifold 16 to the valve body 81, the latter being formed with a plurality of axially staggered ports 86 for admitting air into the inlet end of the tool motor. An axially movable valve member or plug 87 is slidably fitted within the tubular valve body 81 and is axially adjustable therein for blocking any desired portion of the area of the ports 86 by means of a threaded stem 88 extending in threaded engagement through the nut 82 for ready access at the rearward end of the assembly. By adjustment of the valve stem 88 and locking of the same in position by a lock nut 89, the air supply for each individual tool may be regulated as required to obtain the desired equalization of torque between the individual tools. In other words, the provision of an individual air regulating mechanism for each individual tool makes it possible to adjust each tool so that it will stall at the required torque thereby insuring the tightening of each work element to substantially the same degree regardless of variations in performance characteristics of the individual tools.

Although the manifold 16 may conveniently be made from cast iron or other hard metal, it is frequently desirable to use aluminum or some similar corrosion resistant metal in order to avoid difficulties with corrosion which are so commonly encountered in an air supply system. However, since aluminum is a considerably softer metal than cast iron it is necessary to take special precautions to prevent damage to the metal around the openings 71 and 72 during insertion and removal of individual tools in the manner hereinafter described. Accordingly, a sleeve 91 of steel or other hard metal is rigidly fitted in each of the openings 71 and 72 so as to protect the soft metal of the manifold. A flange 92 at the outer end of each sleeve 91 seats against the outside of the manifold wall 67 for accurately locating the sleeve. When the tool is in assembled relation with respect to the manifold 16, the flange portions 76 and 77 of the fluid connector head fit within the protective sleeve 91 with a slight clearance from the inner wall thereof and a sealed connection is insured by means of a pair of O-rings 93 and 94 contained in suitable grooves in the flanges 76 and 77, respectively.

The cartridge type fluid connector employed in the case of the lower row of tools 12 is generally the same as described above in connection with the tool 11. Thus, the connector, designated generally at 96, has a central tubular spool portion 97 with axially spaced radial flanges 98 and 99 carrying O-rings 101 and 102, respectively, for sealing engagement with the protective sleeve or liner 91. In this case, however, the body portion of the tool 12 is somewhat shorter axially than the tool 11 so that an integral tubular extension 103 is provided at the forward end of the connector head 96 for sealed connection with the fluid inlet end of the pneumatic motor section 31 in the same general manner as described heretofore. An air regulating valve of the same character described above is also provided and comprises a tubular valve body 104 extending into the spool portion 97 and having a manipulating portion or nut 106 disposed at the outside of the manifold 16. In this case the inner end of the valve body 104 is connected to the fluid inlet of the motor by means of an intermediate threaded adaptor 107 in order to accommodate the increased length of the fluid connector 96. The spool portion 97 has ports 108 and the tubular valve body 104 has a plurality of axially staggered ports 109 for passage of actuating fluid from the manifold 16 to the motor inlet. A movable valve member or plug 111 is adjustably mounted in the valve body by means of a threaded adjusting stem 112 for coaction with the ports 109 in the same manner as described above in connection with the tool 11.

In order to retain the tools 11 and 12 in assembled relation with respect to the upright support 14 and the upright fluid manifold 16 while at the same time permitting individual tools to be removed readily from the assembly, a plurality of releasable fastening devices are provided at the rearward end of the assembly. As seen in Figs. 2 and 3, the fastening devices in this instance are in the form of L-shaped lugs or elements 113 each of which has an axially extending leg portion seating against the outside of the manifold wall 67 and a laterally extending portion which bridges the juncture between the manifold wall 67 and each connector head. The laterally extending leg of each lug 113 has an elongated slot or aperture 114 through which a screw 116 extends and is threaded into the manifold wall 67. As will be evident from Fig. 2, the L-shaped fastening lugs 113 are disposed at the uppermost edges of the connector head 73 and the lowermost edges of the connector heads 96. Intermediate the two rows of tools, a plurality of flat retainer elements or plates 117 with elongated slots 118 are also provided for bridging the outer ends of adjacent connector heads 73 and 96, and a screw 119 extends through the slot 118 in each element 117 and is threaded into the intervening portion of the wall 67.

It will be apparent that when the screws 116 and 119 are tightened to hold the retainers 113 and 117 in operative engagement, each individual tool and its associated connector head will be rigidly retained in assembled relation with the flange portions 39 and 53 of the tools 11 and 12, respectively, abutting the support plate 14. However, by loosening the screws 116 and 119 the slotted lugs 113 can be shifted radially outwardly to clear the connector heads and the retainers 117 can be rotated sufficiently to release the desired connector head and thereafter the individual tool and its associated connector head may be withdrawn axially through the coaxial opening 71 or 72 in the manifold 16. The rear wall 67 of the manifold 16 is exposed to and is readily accessible to the operator of the tool assembly, and all manipulations required to accomplish removal and replacement of a tool are performed from this readily accessible wall. The awkward operations necessitated by the past arrangements of tools by which the operator was required to reach down into the assembly and unscrew and detach a tool from a support plate and an air manifold have been completely eliminated. Furthermore, other tools of the assembly need not be disturbed in removal and replacement of the one disabled tool.

For removal purposes, a special handle or other implement (not shown) may be used and may conveniently have a threaded connection with the externally projecting valve stems 88 or 112 to facilitate axial withdrawal of an individual tool from the multiple unit assembly.

It will be apparent that the size of the openings 71 and 72 in the manifold is great enough to accommodate axial passage of the tool through the opening either during removal of a tool or replacement thereof. In the case of either the tool 11 or the tool 12, it will be seen that rearward axial withdrawal of the tool toward the manifold 16 will effect simple axial detachment of the pin 62 or pin 64 from the corresponding socket portions in the support plate 14. In the case of a tool 12 continued axial withdrawal will result in complete removal of the tool through the manifold opening 72. However, referring to Fig. 7, in the case of the offset tool 11 the tool is withdrawn axially until the offset gear case section 24 is brought into position adjacent the opening 71. Thereafter, a simple tilting or cocking movement of the tool 11 will permit passage of the offset gear case section through the opening 71 and the axial withdrawal movement may then be completed. In replacing either a tool 11 or a tool 12, the foregoing procedure is merely carried out in reverse fashion and once the tool is substantially in position longitudinally of the assembly, a simple rotative movement will serve to align the pin 62 or 64 with its complementary socket in the plate 14 whereupon the insertion of the tool and tightening of the fastening elements can be completed. During such axial withdrawal and replacement of individual tools through the manifold openings 71 and 72, damage to the soft metal of the manifold around the openings is prevented by reason of the hard metal sleeves or liners 91 and the integral flanges 92 extending radially from the sleeves at the outermost side of the manifold 16.

Figure 4:
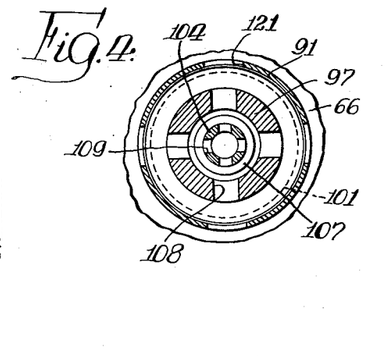
Fig. 4 is a fragmentary transverse sectional view as taken along the line 4—4 of Fig. 3.
Figure 5:
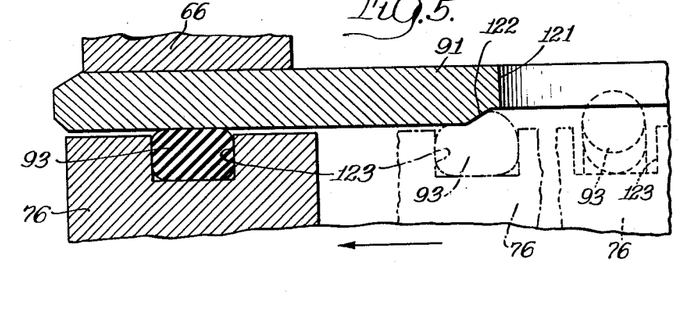
Fig. 5 is an enlarged fragmentary sectional view of a structural detail of Fig. 3 and showing several successive stages during insertion of a tool in the assembly.

Referring to Figs. 3 to 5, it will be seen that each of the sleeves 91 is provided with a plurality of circumferentially spaced openings or ports 121 for the purpose of providing free fluid communication from the interior of the manifold 16 through the ports 121, through the spool portion ports 84 or 108, and thence through the valve body ports 86 or 109 into the fluid inlet of the corresponding tool. However, it has been found that during insertion or removal of an individual tool and its associated connector head, there is serious danger of cutting or otherwise damaging the O-ring seals 93 and 94 or 101 and 102 as these rings are forced past the edges of the lateral openings 121 in the sleeves 91. In other words, when a connector head 73, for example, is in detached relation from the assembly, the compressible O-rings 92 and 93 will project beyond the confines of the ring grooves in the flanges 76 and 77 but when the connector head is forced axially into the sleeve 91 the O-rings are compressed within the grooves to provide the desired sealed engagement. However, during the axial movement of the tool relative to the manifold, the compressed O-ring will expand again as it clears one edge of the sleeve port 121 and is free to project into the port opening, the compression of the other portions of the O-ring not in alignment with the openings tending to squeeze or force its expansion into the openings. As axial movement continues there is a tendency to shear the projecting portion of the O-ring between the opposite edge of the port 121 and the ring groove. In order to overcome this detrimental effect, the port 121 is recessed radially at the interior of the sleeve 91, as best seen in the enlarged view of Fig. 5, and the inner edge or shoulder of the port 121 is beveled or tapered, as at 122, thereby eliminating any sharp projecting edge which would tend to cut or otherwise damage the O-ring.

In Fig. 5, the successive stages of insertion of a tool are shown, the connector head portion being moved to the left relative to the stationary manifold as indicated by the arrow. As shown at the extreme right-hand of Fig. 5 in dotted lines, the flange portion 76 with the O- ring 93 seated in its groove, designated at 123, has cleared the right-hand edge of the sleeve port 121 with the result that the previously compressed ring 93 has now expanded irregularly. In other words, the outermost portion of the uncompressed portion of the ring 93 extends radially outwardly from the groove 123 into the open space provided by the recessed port 121. As axial insertion of the tool continues, the radial projecting portion of the ring 93 engages the beveled shoulder portion 122 at the left-hand side of the sleeve port 121, as indicated in dot and dash lines in Fig. 5. This engagement with the beveled edge 122 results in a relatively gentle squeezing or compressing action on the ring 93 rather than a cutting or shearing action and the ring is thereby forced back into compressed sealing relation substantially within the confines of its groove 123. Continued axial movement of the tool to the left results in the final assembled position shown in full lines at the left-hand side of Fig. 5 wherein the ring 93 is shown in its final sealed relation between the flange 76 and the sleeve 91.

Figure 8:
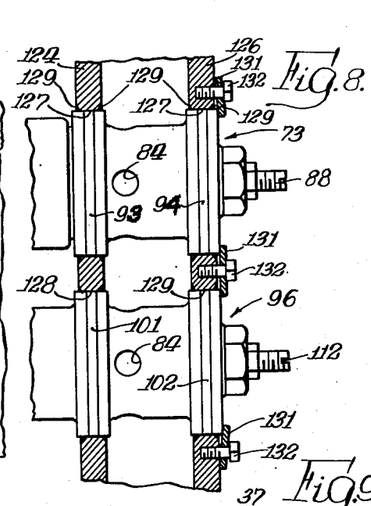
Fig. 8 is a fragmentary view showing a modification of the invention.

Referring to Fig. 8, a modification of the invention is shown wherein the manifold having spaced walls 124 and 126 is made of a relatively hard metal such as cast iron. In such case, there is no appreciable danger of damage to the manifold walls during insertion or withdrawal of an individual tool. Consequently, the protective sleeves 91 as heretofore described are omitted and the connector head portions 73 or 96 are fitted directly in openings 127 and 128, respectively, in the manifold walls. In this case, the O-rings 93, 94, 101 and 102 carried by the connector heads seal directly against the edges of the openings 127 and 128 in the manifold walls. In order to protect the O-rings from damage during withdrawal or insertion of the tool, it is quite important that the edges of the openings 127 and 128 be beveled, as at 129, thereby avoiding cutting of the rings as they are forced axially through the openings. In this modification of the invention, the releasable fastening elements at the outer or rearward ends of the tools may be in the form of apertured washers 131 secured by screws 132 extending into the manifold wall 126 with the washers overlapping the outer edges of the connector heads as clearly seen in Fig. 8. Although not shown in this view, each of the washers 131 preferably has a flat edge on at least one portion of its periphery so that upon loosening the screw 132, the washer 131 may be rotated to clear the corresponding connector head thereby permitting release of the particular tool.

As shown in Figs. 1 and 2, the space between the plate 14 and the air manifold 16 through which the tools 11 and 12 extend, is enclosed by thin side or cover plates 133, 134 and 136. These plates are secured to the outer side edges of the plate 14 and the manifold 16 by screws 137. The plates 134 and 136 terminate short of the movable bed so as to provide openings 134a and 136a, respectively, for the passage of the exhaust air from the pneumatic motors. Secured to the inner faces of the side plates is a layer of sound insulating material 138, such as a fiber glass material, and this layer is covered by a protective thin sheet 139 of perforated sound absorbing metal. The insulating layer 138 extends across the openings 134a and 136a to insulate against the passage of sound but permitting the exhaust air to pass from the chamber. It is well known that a battery of pneumatically operated nutsetters, such as shown in the drawings, are extremely noisy in operation, particularly due to the exhaust noises of the motors in the space between the plate 14 and manifold 16. Consequently, by enclosing that space with a sound insulating and absorbing material, the audible operating noise of the battery of tools is reduced to a minimum, thus minimizing the working strain on plant attendants and machine operators.

A further important feature of the sound insulation structure above described is that it in no way interferes with the removal and insertion of the tools 11 and 12 as above described. Since these tools are removed or inserted rearwardly through the openings in the air manifold 16, the side insulating plates need not be removed for such removal or insertion but may remain intact as a permanent installation. The entire tool 11 or 12 including the extension may be removed for service so that the enclosing plates cannot be considered an obstruction to anything but noise. The advantages of the combination of the insulating and tool removability features of the present invention serve to emphasize the importance and desirability of the structure shown and described since such insulating covers would be impractical with the old style tool batteries wherein the tools were removed from the side of the space between the supporting plate and air manifold.

Although the invention has been described with reference to certain specific structural embodiments thereof, it will be understood that various modifications and equivalent structures may be resorted to without departing from the scope of the invention as defined in the appended claims.

I claim:

1. In a multiple unit tool assembly, a plurality of elongated power operated tools, and support means for mounting the tools for movement thereof as a group but permitting detachment of each tool individually from the assembly, said support means comprising a pair of spaced supporting structures each having a plurality of openings therein coaxial with the respective tools for receiving the latter, said tools extending through the openings in one of said structures and having means detachably connecting the tools to said one structure intermediate the ends of the tools, and said tools having end portions received in the openings in the other of said structures and detachably connected thereto, the openings in said other structure being at least as large as the largest transverse dimension of the individual tools whereby each tool is individually detachable from the support means by bodily axial withdrawal of the tool through the corresponding opening in said other structure.

2. The assembly of claim 1 further characterized in that said tools have axially detachable connecting means coacting with said one structure for restraining the tools against bodily rotation relative to said one structure.

3. In a multiple unit tool assembly, a plurality of elongated power tools arranged in generally parallel side-by-side relation, means for mounting the tools for movement as a group but permitting detachment of individual tools from the assembly, said means including a pair of support structures extending transversely of the longitudinal axes of the tools and spaced axially from each other, said structures each being provided with a plurality of openings coaxial with the respective tools for receiving the latter, said tools extending through the openings in one of said structures for supporting the tools intermediate their ends, axially detachable pin and socket means coacting between each of said tools and said one structure for retaining the tools against rotation relative to said one structure, said tools having end portions detachably received in the openings in the other of said structures, and releasable fasteners coacting between said other structure and said end portions of the tools for holding the latter in assembled relation, the openings in said other structure being large enough to accommodate passage of the tools axially therethrough whereby removal and replacement of individual tools is effected by bodily withdrawal or insertion thereof axially through the openings in said other structure.

4. The assembly of claim 3 further characterized in that said tools each have flange portions engageable with said one structure for positioning the tools longitudinally of the mounting means, and said fasteners are releasably mounted at the outside of said other structure and coact with the outer axial ends of said end portions of the tools for retaining the tools in assembled relation between said support structures.

5. In a multiple unit tool assembly, a plurality of pneumatically actuated tools, a common fluid manifold for supplying actuating fluid to said tools, a plurality of fluid connectors extending rigidly from the respective tools and each providing a detachable sealed connection with said manifold, and releasable fastening means coacting between said manifold and said connectors for retaining the tools in assembled relation with the manifold, each of said tools and its respective connector being individually removable as a unit through the manifold.

6. In a multiple unit tool assembly, a plurality of pneumatically actuated tools, a common fluid manifold for supplying actuating fluid to said tools, said manifold having a plurality of openings therethrough, a plurality of fluid connector heads rigidly secured to the respective tools and providing detachable sealed connections in said manifold openings for the passage of actuating fluid to the respective tools, and means releasably retaining said connector heads in said openings whereby each of said tools and its connector head is removable as a unit through its respective manifold opening for individual detachment of a tool from the assembly.

7. In a multiple unit tool assembly, a plurality of elongated pneumatically actuated tools arranged in generally parallel side-by-side relation and each tool having a fluid inlet at one end thereof, a common fluid manifold at the inlet ends of said tools, said manifold extending transversely of the longitudinal axes of said tools and being provided with a plurality of openings therethrough coaxial with the respective tools, means comprising a plurality of generally tubular connector heads extending rigidly from said tools at the inlet ends thereof and providing detachable sealed connections in said manifold openings for the passage of actuating fluid to the respective tools, and releasable fastener means coacting between said manifold and said connector heads for holding the latter in assembled relation with the manifold, said openings being at least as large as the cross sectional area of said tools whereby each of the individual tools and its connector head is detachable as a unit from the manifold by generally axial removal thereof through the corresponding manifold opening.

8. In a multiple unit tool assembly, a plurality of elongated pneumatically actuated tools arranged in side-by-side generally parallel relation, means mounting said tools for movement thereof in unison comprising an air manifold and a support disposed generally transversely to the axes of the tools adjacent the opposite end portions of the tools, said manifold having a plurality of enlarged openings coaxial with the tools and of sufficient size to accommodate passage of the tools generally axially therethrough, means providing a detachable sealed connection between each tool and one of said openings in the manifold, and means providing an axially detachable engagement between each tool and said support whereby removal and replacement of the individual tools is effected by axial withdrawal or insertion thereof through the respective manifold openings.

9. In a multiple unit tool assembly, a plurality of elongated pneumatically actuated tools each having a fluid inlet at one end thereof, a common fluid manifold at the inlet ends of said tools, connector means on each tool providing a detachable sealed connection with said manifold for supplying actuating fluid to the individual tools, a rigid support detachably engaging the tools in axially spaced relation from said manifold, and means including complementary projection and socket portions on said support and said tools for providing a rapid axially detachable connection therebetween.

10. In a multiple unit tool assembly, a plurality of elongated pneumatically actuated tools arranged in side-by-side generally parallel relation, mounting means for movement of the tools in unison comprising a support plate and an air manifold extending generally transversely to the axes of the tools adjacent the opposite end portions thereof, said plate and said manifold being provided with a plurality of openings coaxial with the tools, said tools extending through the openings in said plate and each tool having means providing a rapidly detachable connection with the plate adapted to be connected and disconnected merely by axial movement of the tool relative to the plate, and means on the tools providing axially detachable sealed connections at the openings in said manifold, said manifold openings being large enough to accommodate the passage of the tools axially therethrough whereby removal and replacement of individual tools is effected by axial withdrawal or insertion thereof through the respective manifold openings.

11. The structure of claim 9 further characterized in that said last-named means comprises an axially extending pin rigidly affixed to the plate adjacent each opening and in axially extending socket in coacting relation on each of said tools and adapted to detachably receive said pin.

12. The structure of claim 10 further characterized in that each of said tools has a socket in spaced parallel relation with respect to the axis of the tool and said plate has an axially projecting pin adjacent each opening whereby the engagement of said pin in said socket and the coaction of the tool with the periphery of said plate opening provides resistance to the torque reaction of the tool during operation thereby holding the tool against rotation.

13. In a multiple unit tool assembly a plurality of pneumatically actuated tools having fluid inlets, a common fluid manifold at the inlets of said tools, said manifold having spaced parallel walls with a plurality of enlarged opposed openings each of sufficient size to accommodate withdrawal or insertion of a tool therethrough, a plurality of generally spool-shaped connector heads each secured to one of said tools at the inlet thereof, each of said heads having a central tubular portion of reduced diameter with aperture means therein providing flow communication between the interior of said manifold and the fluid inlet of the tool, and each of said heads also having axially spaced flange portions of enlarged diameter at opposite ends of the tubular portion and adapted to fit in detachable sealed relation in opposed openings in the manifold walls, and releasable retainer means coacting between said heads and said manifold for holding the tools in assembled relation in the manifold and whereby each of said tools and its associated connector head is detachable as a unit from the manifold by removal thereof through the corresponding opposed openings in the manifold walls.

14. In a multiple unit tool assembly, a plurality of pneumatically actuated tools each having a elongated pneumatically actuated tools each having a fluid inlet, an air manifold having a plurality of openings of sufficient size to accommodate bodily passage of a tool therethrough, a fluid connector disposed at the inlet of each of said tools and providing a detachable sealed connection in one of said manifold openings, adjustable valve structure extending into each fluid connector and coacting with the corresponding tool for rigidly securing the connector in position at the fluid inlet of the tool in unitary relation therewith, said valve structure being adjustable from the exterior of the manifold for individually regulating the flow of actuating fluid from the manifold to the individual tool inlets, and means coacting between the manifold and the connectors for releasably holding the tools in assembled relation in the manifold whereby each tool and its associated connector is detachable as a unit from the manifold by generally axial removal thereof through the corresponding manifold opening.

15. In a multiple unit tool assembly, a plurality of elongated pneumatically actuated tools each having a fluid inlet at one end, means for mounting the tools in side-by-side substantially parallel relation for movement as a group, said means including a fluid manifold disposed at the inlet ends of the tools and a support adjacent the opposite end portions of the tools, flange portions on said tools adapted to engage said support for positioning the tools longitudinally on the mounting means, said manifold having a plurality of openings coaxial with the respective tools and of sufficient size to accommodate bodily passage of a tool through each opening, a fluid connector head extending rigidly from each tool at the inlet end thereof and providing a detachable sealed connection in one of said manifold openings for the passage of actuating fluid from the manifold to the individual tools, and releasable fasteners mounted at the outside of said manifold and coacting with the outer ends of said connector heads for retaining the interconnected heads and tools in assembled relation between said support and said manifold, each of said tools and its associated connector head being detachable as a unit from the mounting means by release of said fasteners and generally axial removal of the tool and connector head through the corresponding manifold opening.

16. The structure of claim 15 further characterized in that said fasteners comprise apertured rigid retainer elements extending laterally across the junctures between the connector heads and the manifold, and threaded elements extending axially through the retainer elements into the manifold.

17. In a multiple unit tool assembly, a plurality of pneumatically actuated tools each having a fluid inlet for introduction of actuating fluid, a fluid manifold having a plurality of enlarged openings of sufficient size to accommodate the passage of individual tools therethrough during removal or installation of a tool, wear resistant sleeve means rigidly mounted in the manifold openings for protecting the edges of said openings, a plurality of fluid connector heads extending rigidly from the inlets of said tools and providing a detachable fit within said sleeve means, compressible seal rings carried by said connector heads and engageable with said sleeve means for providing fluid-tight connections between said heads and said manifold, and releasable fastening means for retaining said tools and associated heads in assembled relation in the manifold, said sleeve means being provided with lateral fluid ports for the passage of actuating fluid from the manifold through the connector heads to the inlets of the individual tools, and said ports being recessed and having beveled inner edges at the interior of said sleeves whereby to avoid detrimental cutting or damage to said seal rings during axial withdrawal or insertion of an individual tool and its associated connector head through a manifold opening.

18. The structure of claim 17 further characterized in that said manifold has a pair of spaced walls with aligned openings therethrough, each pair of aligned openings having a wear-resistant sleeve fitted rigidly therein with said ports disposed between the manifold walls, and each of said connector heads carrying a pair of axially spaced seal rings engageable with the corresponding sleeve at axially spaced points on opposite sides of said ports.

19. In a multiple unit tool assembly, a plurality of power operated rotary tools, each having a housing for enclosing the operating parts thereof and containing the lubricant therefor, and support means for mounting the tools thereof in operating position as a group but permitting ready detachment of each tool individually from the assembly, said support means comprising a supporting plate having a plurality of openings therethrough coaxial with the respective tools for receiving and supporting the latter and also having a plurality of lubricant-conducting passages therein terminating in ports in the walls of said openings and adapted to be connected to a source of lubricant under pressure, and each of said tools having a port opening through its housing into the interior thereof and adapted to be aligned with the port in the wall of its respective opening in said plate when said tool is in supported operable position in said plate whereby said plurality of tools may be simultaneously lubricated by the forcing of lubricant through said plate from a common source.

20. In a multiple unit tool assembly, a plurality of power operated rotary tools, each having a housing for enclosing the operating parts thereof and containing the lubricant therefor, and an extension on the forward end thereof for engagement with a work piece, and support means for mounting the tools thereof in operating position as a group but permitting ready detachment of each tool individually from the assembly, said support means comprising a supporting plate having a plurality of openings therethrough coaxial with the respective tools for receiving and supporting the latter with the tool extension disposed on one side of the plate and the tool on the other side thereof and also having a plurality of lubricant-conducting passages therein terminating in ports in the walls of said openings and adapted to be connected to a source of lubricant under pressure, and each of said tools having a port opening through its housing into the interior thereof and adapted to be aligned with the port in the wall of its respective opening in said plate when said tool is in supported operable position in said plate whereby said plurality of tools and tool extensions may be simultaneously lubricated by the forcing of lubricant through said plate from a common source.

21. In a multiple unit tool assembly, a plurality of power operated rotary tools, each having a housing for enclosing the operating parts thereof and containing the lubricant therefor, and support means for mounting the tools thereof in operating position as a group but permitting ready detachment of each tool individually from the assembly, said support means comprising a supporting plate having a plurality of openings therethrough coaxial with the respective tools for receiving and supporting the latter and also having a plurality of lubricant-conducting passages therein terminating in ports in the walls of said openings and adapted to be connected to a source of lubricant under pressure, and each of said tools having a port opening through its housing into the interior thereof and adapted to be aligned with the port in the wall of its respective opening in said plate when said tool is in supported operable position in said plate whereby said plurality of tools may be simultaneously lubricated by the forcing of lubricant through said plate from a common source, and axially detachable means coacting between each of said tools and said plate for retaining the tools against rotation relative to said plate and for positioning the lubricant ports in the housings of said tools in alignment with the lubricant ports in the walls of said plate openings.

22. In a multiple unit tool assembly, a plurality of power operated rotary tools, each having a housing for enclosing the operating parts thereof and containing the lubricant therefor, and support means for mounting the tools thereof in operating position as a group but permitting ready detachment of each tool individually from the assembly, said support means comprising a supporting plate having a plurality of openings therethrough coaxial with the respective tools for receiving and supporting the latter and also having a plurality of lubricant-conducting passages therein terminating in ports in the walls of said openings and adapted to be connected to a source of lubricant under pressure, and each of said tools having a port opening through its housing into the interior thereof and adapted to be aligned with the port in the wall of its respective opening in said plate when said tool is in supported operable position in said plate whereby said plurality of tools may be simultaneously lubricated by the forcing of lubricant through said plate from a common source, and a projecting member carried by the housing of each of said tools intermediate the ends thereof and adapted to engage the plate and limit the extent of axial movement of the tool through the openings in said plate, the lubricant port in said housing of each of said tools being so spaced axially with respect to the projecting member of its housing that said lubricant port will be in proper alignment with the lubricant port in the wall of a plate opening when the tool is supported in operating position on the plate.

23. In a multiple unit tool assembly, a plurality of power operated rotary tools, each having a housing for enclosing the operating parts thereof and containing the lubricant therefor, and support means for mounting the tools thereof in operating position as a group but permitting ready detachment of each tool individually from the assembly, said support means comprising a supporting plate having a plurality of openings therethrough coaxial with the respective tools for receiving and supporting the latter and also having a plurality of lubricant-conducting passages therein terminating in ports in the walls of said openings and adapted to be connected to a source of lubricant under pressure, and each of said tools having a port opening through its housing into the interior thereof and adapted to be aligned with the port in the wall of its respective opening in said plate when said tool is in supported operable position in said plate whereby said plurality of tools may be simultaneously lubricated by the forcing of lubricant through said plate from a common source, a projecting flange member carried by the housing of each of said tools intermediate the ends thereof and adapted to engage the plate and limit the extent of axial movement of the tool through the openings in said plate, and axially detachable means coacting between said flange member of each of said tools and the plate for retaining the tool against rotation relative to said plate, the lubricant port in said housing of each of said tools being so spaced axially and circumferentially with respect to the projecting flange member and the axially detachable means, respectively, that said lubricant port in said housing will be properly aligned with the lubricant port in the wall of said plate opening when the tool is supported in operating position on the plate.

24. In a multiple unit tool assembly, a plurality of power operated rotary tools, support means for mounting the tools thereof in closely adjacent operating position as a group but permitting ready detachment of each tool individually from the assembly, said support means comprising a supporting plate having a plurality of openings therethrough coaxial with the respective tools for receiving and supporting the latter intermediate their ends, and a projecting member on each of said tools extending radially from one side thereof only and intermediate the ends thereof and adapted to engage the plate and to limit the extent of axial movement of the tool through said openings whereby said tools may be mounted on said plate in closely nested relation with the projecting members extending away from each other in non-overlapping positions.

25. In a multiple unit tool assembly, a plurality of power operated rotary tools, support means for mounting the tools thereof in closely adjacent operating position as a group but permitting ready detachment of each tool individually from the assembly, said support means comprising a supporting plate having a plurality of openings therethrough coaxial with the respective tools for receiving and supporting the latter intermediate their ends, a projecting member on each of said tools extending radially from one side thereof only and intermediate the ends thereof and adapted to engage the plate and to limit the extent of axial movement of the tool through said openings and axially detachable means coacting between said projecting member of each of said tools and said plate for retaining the tool against rotation relative to said plate whereby said tools may be mounted on said plate in closely nested relation with the projecting members extending away from each other in non-overlapping positions.

26. In a multiple unit tool assembly, a plurality of power operated rotary tools, support means for mounting the tools thereof in closely adjacent operating position as a group but permitting ready detachment of each tool individually from the assembly, said support means comprising a supporting plate having a plurality of openings therethrough coaxial with the respective tools for receiving and supporting the latter intermediate their ends, a projecting member on each of said tools extending radially in a generally fan-shaped configuration from one side thereof only and intermediate the ends thereof and adapted to engage the plate and to limit the extent of axial movement of the tool through said openings and axially detachable means coacting between said projecting member of each of said tools and said plate for retaining the tool against rotation relative to said plate whereby said tools may be mounted on said plate in closely nested relation with the projecting members extending away from each other in non-overlapping positions.

27. In a tool assembly, a power operated rotary tool adapted to effect along a linear axis a displacement of a portion of a work piece and support means for mounting said tool and adapted to be moved to and from a fixed operating position to permit the tool to be engaged and disengaged from a work piece, said tool comprising a housing fixedly mounted in said support means, an axially slidable and rotatable driving spindle projecting from said housing and adapted to be operably engaged with the work piece, means for operably engaging said spindle with a work piece, and an elongated spring urging said spindle axially into projected position from said housing, said spring permitting said spindle to be retracted into the said housing an amount equal to the displacement to be effected when the outer end of said spindle is operably and initially engaged with a work piece as the support means is moved to its fixed operating position and thereafter forcing said spindle outwardly from said housing during its driving rotation whereby said spindle moves relative to the support means in the direction of the work piece to remain in operable engagement therewith.

28. In a tool assembly, a power operated rotary tool adapted to effect along a linear axis a displacement of a portion of a work piece and support means for mounting said tool and adapted to be moved to and from a fixed operating position to permit the tool to be engaged and disengaged from a work piece, said tool comprising a housing fixedly mounted in said support means, a main axially slidable and rotatable driving spindle within said housing, an axially slidable and rotatable extension spindle projecting from the forward end of said housing and operably connected with and axially spaced from said main spindle, means for operably engaging said extension spindle with a work piece, an elongated spring for urging said main spindle forwardly in said housing and another elongated spring disposed between said main spindle and said extension spindle for urging said extension spindle into fully projected position from the housing, the combined action of said springs and slidable mounting of said spindles permitting said extension spindle to be retracted within the housing an amount equal to the displacement to be effected by said tool when the outer end of said extension spindle is operably and initially engaged with a work piece as the support means is moved to its fixed operating position and thereafter forcing said spindle outwardly from said housing during its driving rotation whereby said extension spindle moves relative to the support means in the direction of the work piece to remain in operable engagement therewith.

29. In a multiple unit tool assembly, a plurality of power operated rotary tools, support means for mounting the tools thereof in adjacent operating position as a group but permitting ready detachment of each tool individually from the assembly, said support means comprising a supporting plate having a plurality of openings therethrough for receiving and rigidly supporting the latter intermediate their ends against lateral movement, a projecting member on each of said tools extending radially from the sides thereof and intermediate the ends thereof and adapted to engage the plate and to limit the extent of axial movement of the tool through said openings, and an axially detachable pin and socket means coacting between each of said tools and said plate for retaining the tools against rotation relative to said plate, the tools thus being supported in and on said plate against axial, rotary and lateral movement.

30. In a multiple unit tool assembly, a plurality of elongated power operated tools, support means for mounting the tools for movement thereof as a group but permitting detachment of each tool individually from the assembly, said support means comprising a pair of spaced supporting structures each having a plurality of openings therein coaxial with the respective tools for receiving the latter, said tools extending through the openings in one of said structures and having means detachably connecting the tools to said one structure intermediate the ends of the tools, and said tools having end portions received in the openings in the other of said structures and detachably connected thereto, the openings in said other structure being at least as large as the largest transverse dimension of the individual tools whereby each tool is individually detachable from the support means by bodily axial withdrawal of the tool through the corresponding opening in said other structure, closure members secured to and extending around the sides of said supporting structures for enclosing said intervening space in which said tools are positioned, and a layer of sound insulating material secured on the inner surfaces of said closure members.

References Cited in the file of this patent
UNITED STATES PATENTS

| | | |
|---|---|---|
| 2,069,882 | Hall | Feb. 9, 1937 |
| 2,219,484 | Lyon | Oct. 29, 1940 |
| 2,266,302 | Blair | Dec. 16, 1941 |
| 2,649,870 | Keilien et al. | Aug. 25, 1953 |
| 2,651,228 | Taylor | Sept. 8, 1953 |
| 2,681,668 | Lubbert | June 22, 1954 |
| 2,691,314 | Stevens et al. | Oct. 12, 1954 |
| 2,742,807 | Ferm et al. | Apr. 24, 1956 |